Nov. 13, 1934.   E. E. HEWITT   1,980,334
DOOR AND BRAKE VALVE DEVICE
Filed July 6, 1932   2 Sheets-Sheet 1
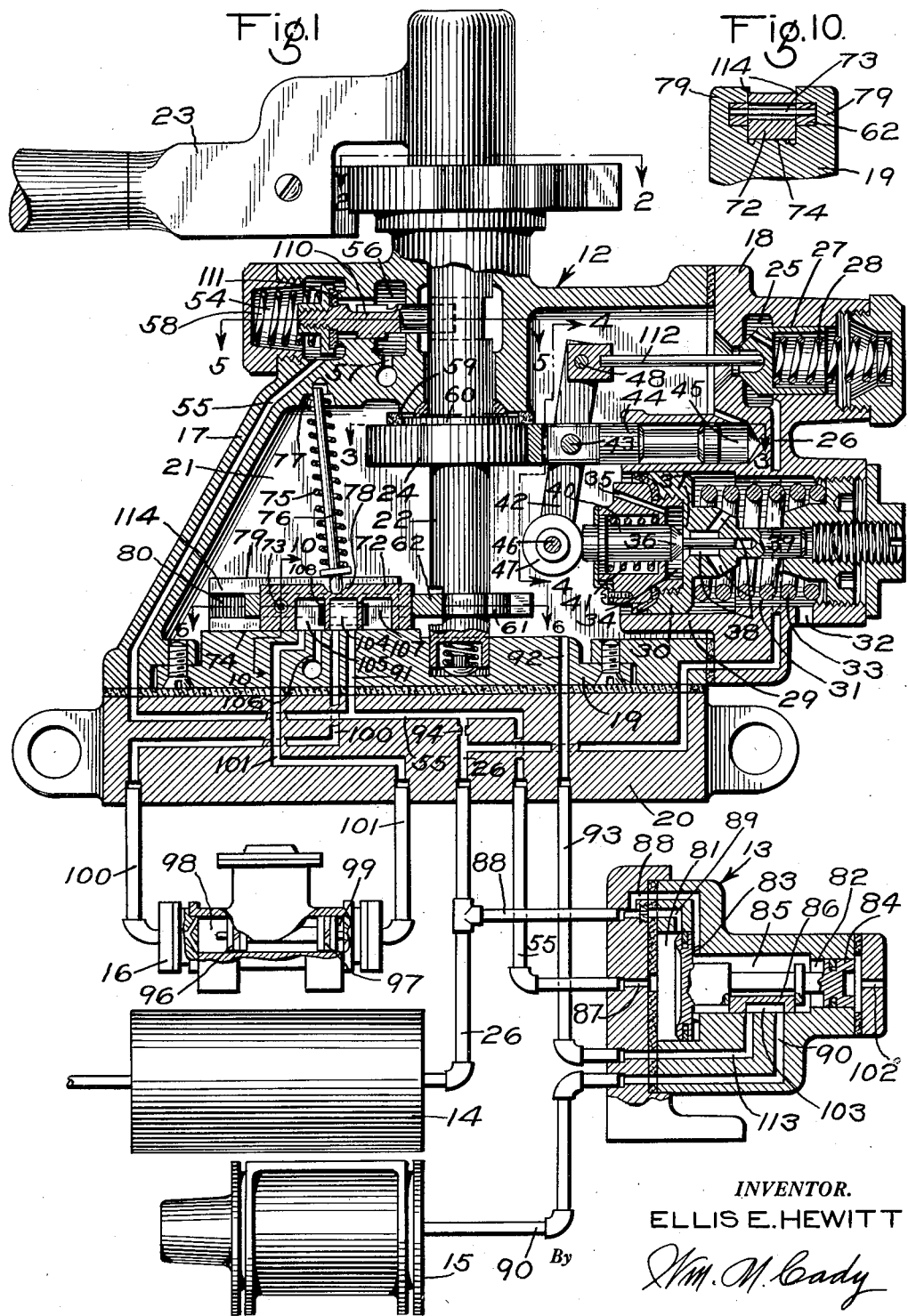
INVENTOR.
ELLIS E. HEWITT
By Wm. M. Cady
ATTORNEY.

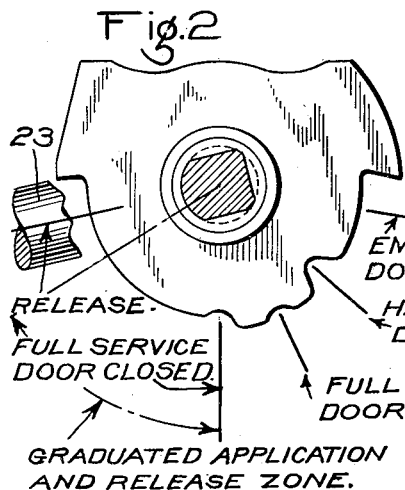
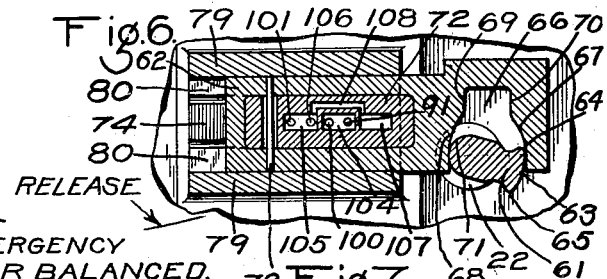
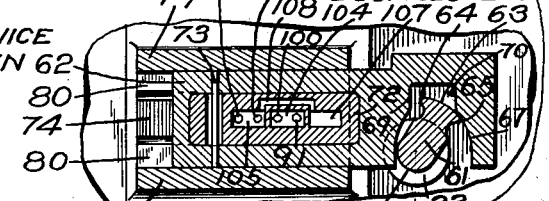
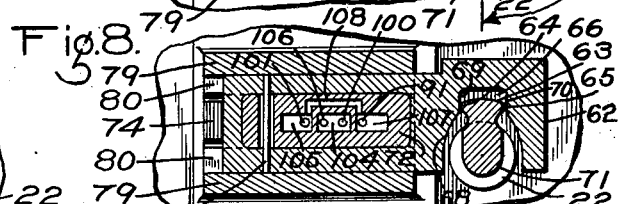
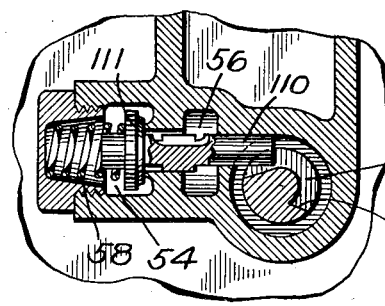
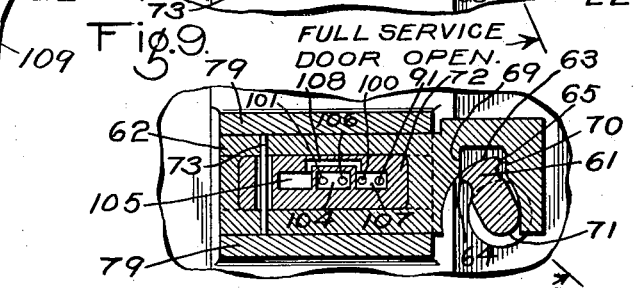
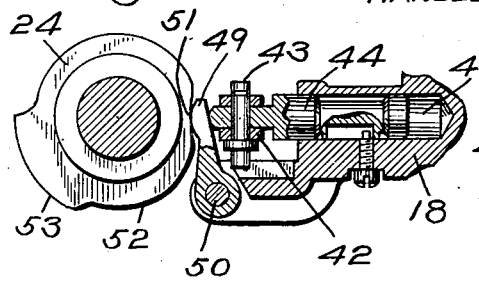
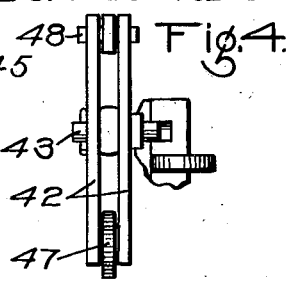

Patented Nov. 13, 1934

1,980,334

UNITED STATES PATENT OFFICE 1,980,334

DOOR AND BRAKE VALVE DEVICE

Ellis E. Hewitt, Edgewood, Pa., assignor to The Westinghouse Air Brake Company, Wilmerding, Pa., a corporation of Pennsylvania Application July 6, 1932, Serial No. 620,993

11 Claims. (Cl. 303—6.1)

This invention relates to improvements in control valve devices for fluid pressure apparatus and more particularly to valve devices for controlling the application and release of the brakes and also the opening and closing of the car doors.

An object of the invention is to provide an improved valve device for controlling the car brakes and the doors.

Another object is to provide an improved brake and door control valve device having a door control valve which is operable only when it is desired to open, close, or balance the doors.

Other objects and advantages will appear in the following more detailed description of the invention.

In the accompanying drawings; Fig. 1 is a diagrammatic view, partly in section, of a car brake and door control equipment embodying my invention; Fig. 2 is a detail sectional view taken on the line 2—2 of Fig. 1; Fig. 3 is a detail sectional view taken on the line 3—3 of Fig. 1; Fig. 4 is an end elevational view of a portion of the brake and door control valve mechanism as viewed in the direction indicated by the line 4—4 of Fig. 1; Fig. 5 is a detail sectional view taken on the line 5—5 of Fig. 1; Figs. 6, 7, 8 and 9 are detail sectional views taken on the line 6—6 of Fig. 1 and show the connections made between the slide valve and its seat in the several positions of the brake valve handle; and Fig. 10 is a detail sectional view taken on the line 10—10 of Fig. 1.

As shown in the drawings, the equipment may comprise a brake and door control valve device 12, an emergency valve device 13, a main reservoir 14, a brake cylinder 15 and a door engine 16.

The brake and door control valve device may comprise a casing having a main section 17, a side section 18, and a bottom section 19. The sections 18 and 19 are removably secured to the main casing by any desired means. The casing section 17 is removably secured to a bracket 20 by any desired means. The casing sections 17, 18 and 19, when secured together, define a pressure chamber 21, which is normally in communication with the brake cylinder 15 in a manner hereinafter described.

An operating shaft 22 is provided, which is rotatably mounted in the casing sections 17 and 19 and may be rotated through the medium of the usual removable handle 23. Mounted on the shaft is a cam 24, which is adapted to control the operation of the brake valve mechanism.

The brake valve mechanism is of the self-lapping type shown and described in the pending application Serial No. 569,158, of Ewing K. Lynn and Rankin J. Bush, filed October 16, 1931, and since the mechanism is fully described in said pending application, it is not considered necessary to repeat the complete description herein. Briefly described then, the brake valve mechanism comprises a chamber 25 in the casing section 18 in constant communication with the main reservoir 14 through a passage and pipe 26. Slidably mounted in the chamber 25 is a supply valve 27, which is subject on one side to the pressure of a coil spring 28. This valve is operative to control communication from the chamber 25 to the chamber 21.

The casing section is provided with a cylinder 29 which is open at one end to the chamber 21. Operatively mounted in the cylinder, adjacent to its open end, is a movable abutment in the form of a piston 30, having at one side a chamber 31 which is constantly open to the atmosphere through a passage 32. The piston is subject to the pressure of a coil spring 33 in the chamber 31.

Contained in a valve chamber 34 in the piston 30, which is open to the pressure chamber 21 through a passage 35, is an exhaust or release valve 36 which is adapted to seat on a valve seat 37 formed on the piston, and which is operative to control communication from the valve chamber 34 to the chamber 31 by way of connected passages 38 in the piston stem 39. The exhaust valve 36 is provided with a stem 40 and is subject to the pressure of a light coil spring 41 for normally holding said valve unseated. The outer end of the valve stem is adapted to be operatively engaged by an operating mechanism which will now be briefly described.

For controlling the operation of the supply and exhaust valves 27 and 36 respectively, a mechanism is provided comprising spaced levers 42 which are pivotally connected, intermediate their ends, to a pin 43 mounted in a plunger 44, which at one end is slidably guided by the casing section 18 within the bore 45.

At one side of the pivot pin 43 the ends of the levers 42 are connected together through the medium of a pin 46 and loosely mounted on the pin 46 and disposed between the levers is a roller 47, which is adapted to operatively engage the outer end of the exhaust valve stem 40. At the other side of the pivot pin 43, the ends of the levers are connected together by means of a pin 48 on which one end of an operating rod 112 is pivotally mounted, the opposite end of the rod operatively engaging one side of the supply valve 27.

A member 49, pivotally mounted on a pin 50 secured to the casing 18, is interposed between and adapted to be engaged by the outer end of the plunger 44 and the peripheral cam surfaces 51, 52 and 53 of the aforementioned cam 24.

For lubricating the peripheral cam faces 51, 52 and 53 of the cam 24, I provide a ring 59, preferably of felt and saturated with oil, disposed on the upper face of the cam and positioned thereon by any desired means, such as a collar on the shaft adjacent said cam face, said collar being a neat fit within said ring.

Preferably above the cam 24, the shaft 22 is provided with a shoulder 109, as shown in Fig. 5, which is adapted to operatively engage the outer end of the stem 110 of a vent valve 111. In the present embodiment of the invention, the shoulder 109 is, for the sake of compactness, formed by notching the shaft, and the end of the stem 110 extends into said notch in the path of travel of the shoulder. The vent valve 111 is mounted in the casing 17 and has at one side a chamber 54 connected through a passage and pipe 55 to the emergency valve device 13, for a purpose which will be hereinafter described, and at the other side a chamber 56 connected to the atmospheric passage 57. The vent valve 111 is subject to the light pressure of a coil spring 58 in the chamber 54.

Preferably below the cam 24, the shaft 22 is provided with a lug 61 which is adapted to operate a yoke member 62, said member being slidably guided, preferably by the two ribs 79 within the open ended slots 80, the ribs being disposed on the inner face of the bottom casing section 19. The lug has an arcuate face 63, which is preferably rounded off at its extremities so as to form the end faces 64 and 65. The path of travel of the lug is within the confines and in the plane of a recess 66 in the yoke member, said recess having a wide portion defined by the side faces 67 and 68, which are arcuate for the major portion of their length, and a narrow portion having the side faces or shoulders 69 and 70.

The arcuate faces 67 and 68 of the recess 66 are of such curvature and so disposed that the lug 61 may be rotated through certain zones, as will be hereinafter explained, without engaging either of said faces and therefore without causing movement of the yoke member 62.

The shoulders 69 and 70 of the recess 66 are adapted to be operatively engaged by the end faces 64 and 65, respectively, of the lug 61 for moving the yoke member 62. The shoulders are spaced apart a distance which will provide slight clearance for the lug, as shown in Fig. 8, when the faces 64 and 65 of the lug are within the narrow portion of the recess and this clearance will prevent any binding action between the lug and the yoke member. This clearance, being small, will also prevent any appreciable unintended movement of the yoke member when the end faces 64 and 65 of the lug are within the narrow portion of the recess 66.

On the shaft 22, and opposite the face 63, an arcuate face 71 is provided. In the present embodiment of the invention, the face 71 is, for the sake of compactness, formed by notching the shaft. The faces 63 and 71 are spaced apart a distance which will provide very slight clearance between said faces and the faces 67 and 68 of the recess 66 when the lug is rotated through zones in which any portions of said faces of the lug will be adjacent to either of said faces of the recess, as shown in Figs. 6, 7 and 9. Thus, within certain zones of rotation of the lug, the yoke member will be held, due to the slight clearance just mentioned, against appreciable unintended movement longitudinally.

From the foregoing, it will be understood that the yoke member is adapted to be moved by the lug when said lug is rotated in either direction through a certain zone and is adapted to be held stationary when the lug is rotated within other zones of rotation.

Carried by the yoke member 62, preferably in a suitable opening, is a slide valve 72 for controlling the operation of the car door, said slide valve being closely confined lengthwise within the opening, so that movement of the yoke member will cause substantially simultaneous and corresponding movement of said slide valve. The slide valve may be secured to the yoke member through the medium of a pin 73, so as to prevent separation of the slide valve and yoke member while being handled, as during inspection and cleaning. The pin is preferably a loose fit in the slide valve, so that said valve may readily adjust itself to a seat 74 which is provided on the inner face of the bottom casing section 19.

The door control slide valve 72 is guided preferably by the faces 114 of the aforementioned ribs 79, said faces being spaced apart a distance which will permit said valve to move freely in a longitudinal direction without excessive lateral movement.

The door control slide valve 72 is pressed into engagement with the seat 74 through the medium of a coiled spring 75 acting upon a rocking pin 76, one end of which is received in a suitable recess 77 in the casing section 17, the other end being received in a suitable recess 78 in the top face of the slide valve.

The emergency slide valve device 13 may comprise a casing having piston chambers 81 and 82, containing connected pistons 83 and 84, respectively, and a valve chamber 85 between the piston chambers, containing a slide valve 86 adapted to be operated by said pistons.

The piston chamber 81 is connected to the vent valve chamber 54 in the brake and door control valve device 12 through passage 87 and pipe and passage 55, said passage 55 having a branch passage 91 leading to the seat of the door control slide valve 72. The piston chamber 82 is open to the valve chamber 85, and said valve chamber is connected to the main reservoir pipe 26 through a passage and pipe 88. When the piston 83 is in release position, as shown in Fig. 1, said piston uncovers a port 89 connecting passage 88 to the piston chamber 81. A passage 113 connected to the slide valve seat leads to the pressure chamber 21 in the brake and door control valve device by way of pipe 93 and passage 92.

The brake cylinder 15 is connected to the seat of the slide valve 86 in the emergency valve device 13 through a pipe and passage 90.

The main reservoir pipe 26 is connected to the chamber 25 of the supply valve 27 in the brake and door control valve device 12 and also to the passage 55 through a restricted passage 94.

The door engine 16 may comprise two connected pistons 96 and 97 for operating the car door (not shown). The piston 96 has at one side a chamber 98, which is connected to the seat of the door control slide valve 72 through a pipe and passage 100. The piston 97 has at one side a chamber 99 which is connected to the seat of the door control slide valve 72 through a pipe and passage 101.

In operation, when the handle 23 is in release position, as shown in Figs. 1 and 2, the operating cam 24 is also in release position, as shown in Fig. 3. Since the cam in its release position does not exert appreciable inward pressure on the member 49 and plunger 44, the pressure of the spring 28 maintains the supply valve 27 seated and the pressure of the spring 41 maintains the exhaust valve 36 unseated.

Fluid under pressure is supplied from the main reservoir 14 to the valve chamber 85 in the emergency valve device 13 through pipe 26 and thence through pipe and passage 88, and to the piston chamber 81 of said valve device through pipes 26 and 88 and the restricted passage 89. Fluid under pressure supplied to pipe 26 may flow to the piston chamber also through the restricted passage 94, passage and pipe 55 and passage 87. Chamber 25 of the supply valve 27 is also supplied with fluid under pressure through pipe and passage 26. The vent valve chamber 54 is supplied with fluid under pressure from the main reservoir through pipe and passage 26, the restricted passage 94 and passage 55.

The side of piston 84 opposite to chamber 82 is open to the atmosphere through the passage 102, and since the pressure of the fluid on both sides of the emergency valve piston 83 will be substantially equal, as supplied from the main reservoir 14, the pressure of the fluid in chamber 82 acting on the smaller piston 84 will shift the pistons and slide valve 86 to the right hand to release position, as shown in Fig. 1.

In release position, the brake cylinder is vented to the atmosphere through pipe and passage 90, cavity 103 in the emergency slide valve 86, passage 113, pipe 93, passage 92, pressure chamber 21, past the unseated exhaust valve 36, through passages 38 in the piston stem 39, spring chamber 31 and passage 32.

In release position, as shown in Fig. 6, a portion of the face 63 of the lug 61 may engage the face 67 of the recess 66 within the yoke member 62, or be in close proximity thereto, and thereby position the door control slide valve 72 in the door closed position, as shown. The door control slide valve will be held in this position against unintended movement, as from the jolting of the car, due to the fact that the clearance between the faces 63 and 71 of the lug 61 and faces 67 and 68, respectively, of the recess is very small, as hereinbefore mentioned.

In the door closed position of the door control slide valve, as shown in Fig. 6, a cavity 104 in said slide valve connects passages 91 and 100, so that fluid under pressure will be supplied from the main reservoir to the piston chamber 98 in the door engine 16 through pipe 26, passages 94 and 91, cavity 104, and door closing passage and pipe 100. Piston chamber 99 of said door engine is vented to the atmosphere through the door opening pipe and passage 101, a cavity 105 in the slide valve 72, and the atmospheric passage 106. With the piston chamber 98 supplied with fluid under pressure and the piston chamber 99 vented to the atmosphere, the pistons 96 and 97 will be shifted to the right hand, or door closed position.

To effect a service application of the brakes without causing the door to open, the handle 23 of the brake and door control valve device 12 is moved in a counter-clockwise direction from release position to full service, door closed, position, or to any position within the graduated application and release zone. This movement of the handle will cause the shaft 22 and cam 24 to also turn in a counter-clockwise direction. As the cam is thus moved, the levers 42 are operated, through the engagement of the cam surface 52 with the member 49, so as to cause the exhaust valve 36 to be seated and the supply valve 27 to be unseated, in the manner described in the aforementioned pending application. Seating of the exhaust valve closes the atmospheric communication from the pressure chamber 21 in the brake and door control valve device and consequently from the brake cylinder 15, inasmuch as the brake cylinder is in communication through the emergency valve device with chamber 21, as aforementioned. Unseating of the supply valve 27 opens the chamber 25 to the chamber 21, so that fluid under pressure supplied from the main reservoir 14 through pipe and passage 26 flows to the brake cylinder through pressure chamber 21 and passage 92 in the brake and control valve device, pipe 93, passage 113 in the emergency slide valve device 13, cavity 103 in the slide valve 86, and passage and pipe 90, thus effecting an application of the brakes.

Now when the pressure of fluid in pressure chamber 21 acting on one side of the piston 30 is slightly greater than the opposing pressure of the spring 33 acting on the other side of the piston, the piston will move inwardly. As the piston is thus being moved, the action of the spring 28 causes the supply valve 27 to be seated. Further flow of fluid under pressure from the main reservoir to the chamber 21 is thus closed off and the inward movement of the piston 30 is stopped by the action of the spring 33. The exhaust valve 36 is maintained seated by the spring 28 acting on said valve through the medium of the rod 112, pin 48, levers 42, pin 46, roller 47, and exhaust valve stem 40. Thus the mechanism controlling the application and release of the brakes is automatically lapped.

It will be noted from Figs. 6 and 7, that during the above mentioned movement from release position to full service, door closed, position or to any intermediate position, the door control slide valve 72 is not moved because the end face 64 of the lug 61 has not yet been moved into engagement with the shoulder 69 of the recess 66 in the yoke member 62, and said slide valve is held stationary against accidental movement by the aforementioned slight clearance between the faces 63 and 71 of the lug and faces 67 and 68 respectively, of the recess 66. Inasmuch as the door control slide valve thus remains stationary, the port connections established by said slide valve in release position are maintained, so that the door engine piston chamber 98 will be maintained charged with fluid under pressure and the door engine piston chamber 99 of said door engine will be vented, as hereinbefore described. The door engine is, therefore, maintained in the door closing position.

To open the car door after a service application has been effected, the handle 23 of the brake and door control valve device 12 is moved in a counter-clockwise direction to full service, door open, position. During this movement, the end face 64 of lug 61 is brought into operating engagement with the shoulder 69 of the recess 66 of the yoke member 62, causing said member, and the door control slide valve 72, to be moved to the left hand to the door opening position shown in Fig. 8. The slide valve will be held in door opening position against unintended movement due to the aforementioned small amount of clearance between the end faces 64 and 65 of the lug 61 and the shoulders 69 and 70, respectively, of the recess 66.

In the door open position, passage 91 is disconnected from the door closing passage and pipe 100 and is connected to the door opening passage and pipe 101 through cavity 107, passage 108, and cavity 105 in the slide valve 72, so that fluid under pressure is supplied from passage 91 to the door engine piston chamber 99. The door engine piston chamber 98 is vented to the atmosphere through the door opening pipe and passage 100, cavity 104 in the door control slide valve 72 and the atmospheric passage 106. The pistons 96 and 97 are thereby moved to the left hand, so as to operate the mechanism for effecting the opening of the car doors.

It will be noted that fluid under pressure supplied from passage 91 in the door opening position of the door control slide valve 72 for operating the door engine, as above mentioned, is supplied from the main reservoir 14 through pipe and passage 26, restricted passage 94 and passage 55. Since the passage 55 is connected through pipe 55 and passage 87 to the piston chamber 81 in the emergency valve device 13, the flow of fluid under pressure from passage 91 will result in a flow of fluid under pressure from said piston chamber, but the reduction in fluid pressure caused by said flow will not be sufficient to effect operation of the emergency valve device.

If, after the brakes have been fully applied in full service, door closed, position of the handle of the brake and door control valve device, the handle is moved to full service, door open, position, the self-lapping mechanism of said device will not be operated, so that fluid under pressure is not supplied from said device to the brake cylinder. If, however, the brakes have been only partially applied before the handle of the brake and door control valve device is moved to full service, door open, position, then when the handle is moved to said position, the self-lapping mechanism will be operated, as hereinbefore described, to effect a full service application of the brakes.

It will be noted from the foregoing that the car door cannot be opened without making an application of the brakes which will bring the car to a stop or at least materially reduce the speed of the car.

To completely release the brakes and close the car door, the handle 23 is returned to release position. As the cam 24 is being moved to this position, the action of the spring 41 causes the exhaust valve 40 to be unseated, as before described, permitting fluid under pressure to flow from the chamber 21 and the brake cylinder 15 to the atmosphere. As the pressure of fluid in chamber 21 reduces, the piston 30 is caused to move outwardly by the action of the spring 33. The unseated exhaust valve 36 now moves forward with the piston, causing the levers 42 to rock in a clockwise direction about the pin 48. Through the medium of the pin 43, this movement of the levers causes the plunger 44 to move longitudinally toward the cam 24 to substantially the position shown in Fig. 1. Since the supply valve 27 is maintained seated and the exhaust valve unseated, the brake cylinder 15 is open to the atmosphere, consequently the complete release of the brakes is effected.

During the above mentioned movement of the handle 23 to release position, the lug 61 is rotated in a clockwise direction from the position shown in Fig. 8 to release position, as shown in Fig. 6. During the initial movement of the lug, the end face 65 of the lug is moved into operating engagement with the shoulder 70 of the recess 66 in the yoke member 62 and said member is thereby moved to the right hand until the face 65 is moved out of engagement with said shoulder, as shown in Fig. 7, at which time the handle 23 will be substantially in full service, door closed, position. As the lug and the yoke member are now operatively disengaged, during the remainder of the movement of the handle and lug toward release position, the yoke member 62 will remain in the position shown in Fig. 7 and when the handle has been returned to release position, the lug and the yoke member will assume the relative positions shown in Fig. 6. Inasmuch as movement of the yoke member causes corresponding movement of the door control slide valve 72, said slide valve will be moved to the door closing position shown in Fig. 7, where it will remain while the handle is being returned to release position. Thus, it will be seen that when effecting a release of the brakes and closing of the car door, the door control slide valve will be shifted promptly to the door closing position and will be held there while the handle movement is continued to release position.

In the door closing position of the door control slide valve 72, communication is reestablished between the supply passage 91 and the door closing passage and pipe 100 through cavity 104 in said slide valve and between the door opening pipe and passage 101 and the atmospheric passage 106 through cavity 105 in said slide valve. Fluid under pressure is thus supplied to the door engine piston chamber 98 and fluid under pressure is vented from the door engine piston chamber 99, which will cause the pistons 96 and 97 to be moved to the right hand, so as to operate the mechanism for effecting the closing of the door.

If, instead of releasing the brakes and closing the door, it is desired to hold the brakes applied and to close the door, the handle 23 of the brake and door control valve device 12 is moved from the full service, door open, position to full service, door closed, position. In said latter position, the self-lapping mechanism remains lapped so that the brakes are held applied. The door control slide valve 72 is moved to the door closing position shown in Fig. 7, so that the door engine will be operated, as hereinbefore described, to effect the closing of the door.

To effect an emergency application of the brakes, the handle 23 is moved in a counterclockwise direction to emergency, door balanced, position, in which the shoulder 109 on the shaft 22 engages the stem 110. The stem is then shifted so as to unseat the vent valve 111 and permit the venting of fluid from chamber 54 and passage and pipe 55 to the atmosphere past the valve 111 and stem 110 into chamber 56 and then through the atmospheric passage 57.

The venting of fluid from the pipe 55 permits fluid to be vented from the piston chamber 81 of the emergency valve device 13 at a faster rate than fluid can be supplied through the restricted passage 89. The venting of fluid from said chamber causes the pistons 83 and 84 to be moved to emergency application position by the high pressure of the fluid in valve chamber 85, and the slide valve 86 is thus moved so as to uncover the passage 90 and permit the supply of fluid under pressure from the main reservoir 14 to the brake cylinder through the pipe 26, pipe and passage 88, valve chamber 85, and passage 90, to effect an emergency application of the brakes. Excessive loss of fluid from the main reservoir through pipe 26, passage 94, and the vented passage 55 is prevented by the restriction in passage 94.

The movement of the handle 23 to emergency position causes the cam 24 to be rotated until the cam surface 53 engages the member 49 and through said engagement operates the levers 42, in the same manner as when a service application is being effected, to seat the exhaust valve 36 and to unseat the supply valve 27. Therefore, should the emergency valve fail to operate from any cause, an application of the brakes is assured, since the self-lapping mechanism is also operated when an emergency application of the brakes is being effected.

As the handle 23 of the brake and door control valve device is being moved to emergency position, the end face 64 of the lug 61 engages the shoulder 69 on the yoke member 62 and through said engagement moves said member to the left hand to the position shown in Fig. 9, at which time the handle will be in handle-off, door closed, position, which will be described later. As the handle movement is continued beyond said last mentioned position to emergency position, the lug is operatively disengaged from the yoke member and said member will, therefore, remain in the position shown in Fig. 9, where it will be held against unintended movement, in the manner hereinbefore described.

The above mentioned movement of the yoke member 62 causes the door control slide valve 72 to be likewise moved to the position shown in Fig. 9, in which cavity 107 connects the door closing passage 100 to passage 91. As passage 91 leads to the vented passage 55, the door engine piston chamber 98 will be vented. The door engine piston chamber 99 is vented to the atmosphere through pipe and passage 101, cavity 104 in the slide valve 72 and the atmospheric passage 106. As both of the pistons 96 and 97 of the door engine are subjected to atmospheric pressure, thus balancing the fluid pressure on the pistons, the car door may be readily opened by hand in the usual well known manner.

A handle position identified as handle-off, door closed, position is provided, as shown in Fig. 2, in which the handle 23 is adapted to be removed, as when changing ends on a double end car. In this position, the self-lapping mechanism is operated in the manner hereinbefore described, so as to effect an application of the brakes. As the lug 61 is rotated to said position, the end face 64 of said lug engages the shoulder 69 of the recess 66 in the yoke member 62 and causes said member to be moved to the left hand to the position shown in Fig. 9, where it will be held against accidental movement, in the manner hereinbefore described.

The above mentioned movement of the yoke member causes the door control slide valve 72 to be moved to the left hand to the door closing position shown in Fig. 9, in which, if the handle has been moved from release position or full service, door closed, position or from any intermediate position without pause in full service, door open, position, the door will be held closed. If, however, the handle is first moved to full service, door open, position so as to effect an application of the brakes and the opening of the door, and then moved to handle off, door closed, position the brakes will remain applied and the door will be closed.

In the door closed position of the door control slide valve 72, as shown in Fig. 9, the door opening passage 101 is connected through cavity 104 to the atmospheric passage 106, and the door closing passage 100 is connected through the cavity 107 to the supply passage 91. Thus, fluid under pressure is supplied to the door engine piston chamber 98 while the piston chamber 99 is vented to the atmosphere, which will cause the door engine pistons 96 and 97 to remain in the door closed position if the handle 23 is moved from a position within the graduated application and release zone, or to be moved to the door closed position if the handle 23 has been first moved to full service, door open, position to effect an application of the brakes and the opening of the door.

As hereinbefore noted, when the vent valve 111 is operated to effect an emergency application of the brakes, the restricted passage 94 will prevent excessive loss of fluid under pressure from the main reservoir 14 through pipe and passage 26 and the vented passage 55. Also, in the event of a broken emergency pipe 55, said restricted passage will prevent excessive loss of fluid under pressure from the main reservoir through pipe and passage 26 and the broken pipe 55.

From the foregoing description, it will be understood that I have provided an improved brake and door control valve device, in which the valve for controlling door operation and the mechanism for controlling the operation of the brakes are adapted to be operated by a single shaft and in which the valve for controlling door operation remains stationary in the zone defined as the graduated application and release zone, between release position and full service, door closed, position of the operating handle. As this is the zone in which the operation of the brakes is normally controlled, it will be appreciated that the force required to move the operating handle to control normal brake operation will be only that required to control the operation of the brake valve mechanism. As the door control valve thus remains stationary during the major portion of the handle movements, the amount of wear of said valve, its seat, and associated parts is reduced to a minimum.

It will be seen, furthermore, that novel means have been provided for holding a door control valve of the slide valve type against unintended movement, such as might be caused by the jolting of the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a valve device for controlling the fluid pressure brakes and doors of a vehicle, the combination with a valve mechanism operable to control the brakes, of valve means operable to control the opening and closing of a door of the vehicle, and means operable over a predetermined zone of movement for controlling the operation of said valve mechanism and said valve means whereby said door is held closed and operable to a position beyond one limit of said zone for operating said valve means to effect the opening of the door, said means being also operable upon movement from said position to said zone limit to operate said valve means to effect the closing of the door.

2. In a valve device for controlling the fluid pressure brakes and doors of a vehicle, the combination with a valve mechanism operable to control the brakes, of valve means operable to control the opening and closing of a door of the vehicle, means operable over a predetermined zone of movement for controlling the operation of said valve mechanism and said valve means whereby said door is held closed and operable to a position beyond one limit of said zone for operating said valve means to effect the opening of the door, said means being also operable upon movement from said position to said zone limit to operate said valve means to effect the closing of the door, and an arm included in said means for actuating said valve means when said means is moved out of said zone.

3. In a valve device for controlling the fluid pressure brakes and doors of a vehicle, the combination with a valve mechanism operable to control the brakes, of valve means operable to control the opening and closing of a door of the vehicle, means operable over a predetermined zone of movement for controlling the operation of said valve mechanism and said valve means whereby said door is held closed and operable to a position beyond one limit of said zone for operating said valve means to effect the opening of the door, said means being also operable upon movement from said position to said zone limit to operate said valve means to effect the closing of the door, and an arm included in said means for actuating said valve means when said means is moved through a zone located beyond the first mentioned zone of movement.

4. In a valve device for controlling the fluid pressure brakes and doors of a vehicle, the combination with a valve mechanism operable to control the brakes, of valve means operable to control the opening and closing of a door of the vehicle, means operable over a predetermined zone of movement for controlling the operation of said valve mechanism and said valve means whereby said door is held closed and operable only after one limit of said zone is passed for operating said valve means to effect the opening of said door and an arm included in said means for actuating said valve means when said means is moved out of said zone and for maintaining said valve means in any door controlling position against unintentional movement.

5. In a valve device for controlling the fluid pressure brakes and doors of a vehicle, the combination with a valve mechanism operable to control the brakes, of a rotatable shaft, means on said shaft for controlling the operation of said mechanism, a slide valve operable to control the door of the vehicle, a yoke member associated with said slide valve and having an end portion extending beyond one end of said slide valve, an arm on said shaft adapted to operatively engage said portion of said yoke member for operating said slide valve, and means for operating said shaft.

6. In a valve device for controlling the fluid pressure brakes and doors of a vehicle, the combination with a valve mechanism operable to control the brakes, of a rotatable shaft, means on said shaft for controlling the operation of said mechanism, a slide valve operable to control the door of the vehicle, a yoke member associated with said slide valve and provided with a recess, an arm on said shaft adapted to operatively engage said yoke within said recess for operating said slide valve, and means for operating said shaft.

7. In a valve device for controlling the fluid pressure brakes and doors of a vehicle, the combination with a valve mechanism operable to control the brakes, of a rotatable shaft, means on said shaft for controlling the operation of said mechanism, a slide valve operable to control the door of the vehicle, a yoke member for actuating said slide valve, an arm on said shaft for actuating said yoke member, means for guiding said yoke member, and means for operating said shaft.

8. In a valve device for controlling the fluid pressure brakes and doors of a vehicle, the combination with a valve mechanism operable to control the brakes, of a rotatable shaft, means on said shaft for controlling the operation of said mechanism, a slide valve movable in a direction transversely of said shaft to control the door of the vehicle, a yoke member operatively engaging the ends of said slide valve for actuating the slide valve, an arm on said shaft for actuating said yoke member, means for guiding said slide valve, and means for operating said shaft.

9. In a valve device for controlling the fluid pressure brakes and doors of a vehicle, the combination with a valve mechanism operable to control the brakes, of a rotatable shaft, means on said shaft for controlling the operation of said mechanism, a slide valve operable to control the door of the vehicle, a yoke member for actuating said slide valve, an arm on said shaft for actuating said yoke member, means for guiding said slide valve and said yoke member, and means for operating said shaft.

10. In a valve device for controlling the fluid pressure brakes and doors of a vehicle, the combination with a valve mechanism operable to control the brakes, of a rotatable shaft, means on said shaft for controlling the operation of said mechanism, a yoke member having an opening, a slide valve movable in a direction transversely of said shaft for controlling the door of the vehicle and operatively disposed in said opening in said yoke member, means on said shaft for actuating said yoke member, and means for operating said shaft.

11. In a valve device controlling the fluid pressure brakes and doors of a vehicle, the combination with a valve mechanism operable to control the brakes and having a release position and a full application position and being movable from the release to the full application position, of valve means operable to control the opening and closing of a door of a vehicle, and means operable only beyond said full application position for operating said valve means to effect the opening of the car door.

ELLIS E. HEWITT.